July 31, 1951  R. A. HOEY  2,562,459
AUTOMATIC PARACHUTE RELEASE
Filed Jan. 14, 1949
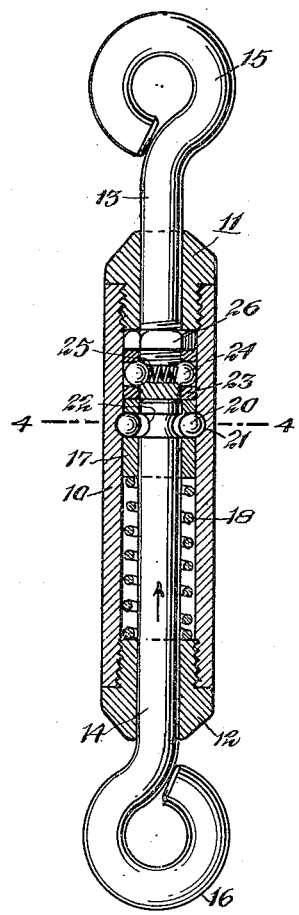
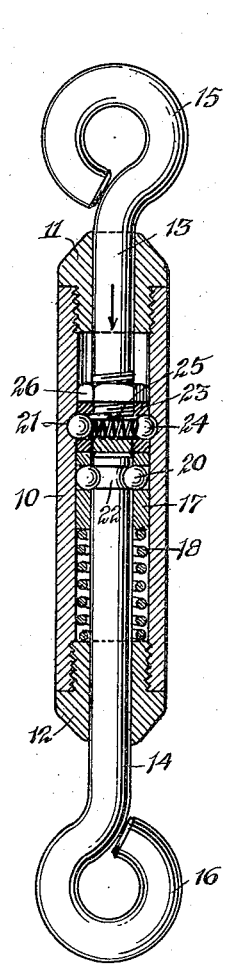
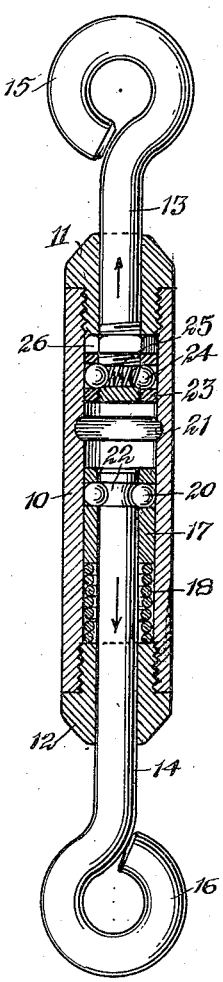
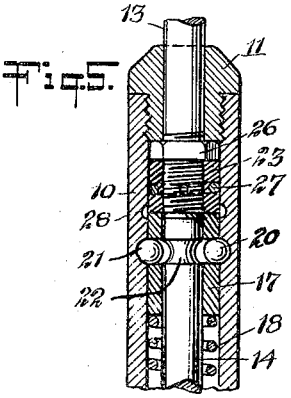
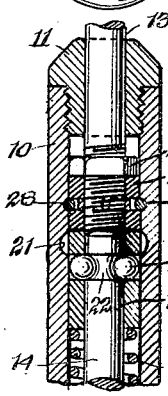
Robert Allen Hoey
BY
Munn, Liddy & Glaccum
Attorneys Patented July 31, 1951

2,562,459

UNITED STATES PATENT OFFICE 2,562,459

AUTOMATIC PARACHUTE RELEASE

Robert Allen Hoey, New York, N. Y., assignor to Richard Keoleian, New York, N. Y.

Application January 14, 1949, Serial No. 70,823

3 Claims. (Cl. 294—83)

This invention relates to new and useful improvements in connectors and has particular reference to automatically releasable connectors for parachutes.

The main object of the invention is to provide a simple, efficient, durable, strong and quick-acting device which will instantly release the parachute from the load supported thereby when the load hits the ground, thereby avoiding the dragging of the load over the terrain.

In brief and general terms, the invention includes a tube closed at each end and receiving drag and release bolts at opposite ends and for movement therewithin, the release bolt engaged by a member within the tube is releasable from said member when said member is in one position within the tube and locked to said member, when said member is in any other position within the tube, in combination with a spring within the tube and engaging said member and tending to move it to said predetermined first position.

Further the invention includes a simple metal tube disposed between the load and the chute. This is closed at both ends and into the ends extend hook bolts connected respectively to the chute and the load and nominated as drag and release bolts. A sleeve within the tube is adapted to receive the release bolt when disposed in a predetermined position in the tube and means, associated with the sleeve and the bolt, lock the bolt to the sleeve when the sleeve is in another position therewithin. A spring within the tube exerts force on the sleeve and, when the pull of the load is taken off the release bolt as the load hits the ground, moves the sleeve to a position where the bolt is automatically released so that the load is not drawn over the terrain by the chute with the inevitable damage to the load goods.

More particularly, the invention includes slidable members in the tube connected to the respective bolts and having elements thereon to latch with interior grooves formed in the tube to hold these members in definite positions. In the case of the release bolt, the elements on the sleeve are balls in races which release the bolt when the balls lie in a groove and lock the bolt when the balls do not lie in said tube groove.

The present preferred forms which the invention may assume are shown in the drawings, of which:

Fig. 1 is a longitudinal section through the device showing the parts in a position assumed when the release pin can be removed;

Fig. 2 is a similar view showing the parts in the position when the release pin is locked but not under load;

Fig. 3 is a similar view showing the parts in the position when the device is under a load;

Fig. 4 is a horizontal section taken on the line 4—4 of Fig. 1;

Fig. 5 is a partial vertical section taken through a modified form of the invention showing the parts in a released position; and, Fig. 6 is a similar view of the same form showing the parts in a locking position.

Referring now merely to the specific detailed construction of the forms of the invention illustrated, it can be seen in Figures 1, 2 and 3, which represent the preferred form, that I have provided a steel tubing 10 having interior threads at each end to receive threaded bored caps 11 and 12 through which extend respectively bolts 13 and 14, having respective eyes 15 and 16 thereon. These bolts or pins are slidable with respect to the caps 11 and 12.

Disposed within the tubing 10 is a sleeve 17 which surrounds the bolt 14 in part and is slidable within the tubing 10. Beneath the sleeve 17 is disposed a compression spring 18. This sleeve is provided with a plurality of ball races 19 to receive balls 20. At a predetermined position within the tubing 10, it is provided with an annular groove 21 and when the sleeve 17 is in a predetermined position within the tubing 10 under the impulsion of spring 18, the balls 20 will be level with this groove 21 and may be moved to lie in said groove, as shown in Fig. 1. The upper end of bolt 14 is provided with a circumferential groove 22 and the diameter of the bolt is such as to permit it to slide within the sleeve 17. With the balls shown in the position illustrated in Figure 1, the bolt 14 may be shoved up through the cap 12 into the sleeve 17. If pushed up far enough, it will force the balls into the groove 21 and then bring the groove 22 in the bolt in line with the balls.

The lower end of the bolt 13, which is called the "drag bolt," is threaded to receive a collar 23 thereon. This collar 23 and the lower end of the bolt 13, are provided with passages to receive oppositely disposed balls 24 with a spring 25 lying therebetween, intended to force the balls 24 outwardly against the inner surface of the tubing 10. A lock nut 26 is threaded on to the bolt 13 above the collar 23 and takes the impact against the cap 11 when the bolt is pulled up under load.

With the parts as shown in Figure 1, the bolt or pin 14 can drop out of the tubing 10, but the operator may hold it in this position with one hand while with the other hand, he may press down on the bolt 13 causing the bolt 14 and the sleeve 17 to be pushed down by the pressure against them of the collar 23 so that the sleeve 17 assumes the position shown in Figure 2, where the balls 20 are at a level below the groove 21, the sleeve 17 pushing against the resistance of spring 18 and the balls 24 of the collar 23 now lying in the groove 21 and latched therein to hold the parts in the illustrated position. This is the position where the parts are locked to hold the release bolt 14 in the device before the load is applied. This locking action takes place because the balls 20 have now been moved into the groove 22 on the upper end of the bolt 14 and are held there by their tight engagement with the inner wall of the tubing 10.

When a chute is connected to the hook 15, and a load to be carried by the chute is connected to the hook 16, the drag of the load will tend to pull the sleeve 17 further downwardly as shown in Figure 3, and when the chute opens up it will exert pull on the bolt 13 or drag bolt. It is obvious that with the parts under load and in the position shown in Figure 3, the release bolt 14 is locked but that as soon as the load hits the ground, the drag of it on the bolt 14 will be released and the spring 18 will be allowed to push the sleeve 17 and the bolt 14 upwardly again to the position shown in Figure 1, where the balls 20 can move into the groove 21 in the tubing 10 and the bolt 14 thus will be released. This action will of course, take place automatically so that as soon as the load lands, it is in this manner released from the parachute which consequently, will not be abe to drag the load along the ground, with the consequent damage to the load.

In Figures 5 and 6, the parts are substantially the same except that the collar 23 has a peripheral groove in which lies a split spring ring 27 and the tubing 10 has a similar annular groove 28 on its inner wall above the groove 21, and this groove 28 is adapted to receive the split ring 27 when the collar 23 is moved downwardly to the position shown in Figure 6, which corresponds to the position shown in Figure 2.

It is apparent that when the release bolt is inserted to the position shown in Figure 2 and the drag bolt is shoved down to the position shown in Figure 2, that the parts are already to be connected to a load and parachute and that while they are in this Figure 2 position, the device can be moved or thrown around without dislodgement of the parts from this relation. However, the instant that a load is applied and a chute attached, the parts move instantly to their load positions and can not be released until the load hits the ground, whereupon the release of the bolt takes place automatically.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

1. In a device of the class described, a tube closed at each end, a drag bolt extending into the tube at one end and a release bolt extending into the tube at the other end, a collar on the drag base slidable within the tube, a sleeve slidable within the tube and adapted to receive the release bolt, means associated with the tube and the sleeve to lock the release bolt to the sleeve in certain positions of the sleeve and to permit the release of the release bolt from the sleeve when the sleeve is moved to a predetermined position and means within the tube engaging said sleeve and tending to move it to said predetermined position.

2. In a device of the class described, a tube closed at both ends, a drag bolt extending thereinto at one end and a release bolt extending into the tube on the other end, a sleeve slidable within the tube and having ball races with balls therein, a spring beneath the sleeve tending to move it in a given direction, said tube having an annular groove to receive the balls on the sleeve when the sleeve is moved by the spring to aline the balls with the groove, said release bolt insertable into and removable from said sleeve when the sleeve is in this position, said release bolt having an annular groove adapted to receive said balls in the sleeve when the balls are moved thereinto as the sleeve is moved to disalign the balls from the groove in the tube, a collar on the inner end of the drag bolt, spring-pressed means on the collar adapted to press against the walls of the tube and engageable with the groove in the tube as the dragbolt is pressed down to move the sleeve and its associated balls from a normal position to a position in which the balls on the sleeve are locked to the release bolt.

3. In a device of the class described, a tube having removable caps at each end, a drag bolt slidably extending into the tube through one cap, a release bolt slidably extending into the tube through the other cap, a collar on the inner end of the drag bolt, spring pressed means on said collar adapted to press against the inner walls of the tube, a sleeve slidable within the tube, a spring between the sleeve and one of said caps, said sleeve adapted to receive the release bolt, ball means on the sleeve, said tube and said release bolt having annular grooves therein, said balls on the sleeve adapted to lie in the groove on the sleeve when the sleeve is in one position and permit the withdrawal of the release bolt from the sleeve and to lie in the groove on the release bolt when the sleeve is moved to another position, whereby the release bolt is locked to the sleeve, said drag bolt and collar adapted to be moved to move the sleeve to a position in which the sleeve is locked to the release bolt.

ROBERT ALLEN HOEY.

REFERENCES CITED

The following references are of record in the file of this patent:

UNITED STATES PATENTS

| Number | Name | Date |
|---|---|---|
| 1,197,117 | Fried | Sept. 5, 1916 |
| 2,254,755 | Sand | Sept. 2, 1941 |
| 2,255,695 | Bull | Sept. 9, 1941 |